United States Patent

[72] Inventor August F. Haach
Torrance, Calif.
[21] Appl. No. 876,421
[22] Filed Nov. 13, 1969
[45] Patented June 29, 1971
[73] Assignee The United States of America as
represented by the Secretary of The United
States Air Force

[54] PNEUMATIC PRESSURE REGULATOR
REDUNDANT VALVING
4 Claims, 2 Drawing Figs.
[52] U.S. Cl. ..................................................... 137/614.19,
137/614.11, 137/614.18
[51] Int. Cl. ....................................................... G05d 16/10
[50] Field of Search ........................................... 137/614.19,
614.18, 614.11, 614.13, 512.3, 513, 625.5

[11] 3,589,398

[56] References Cited
UNITED STATES PATENTS
1,376,868  5/1921  Gibson ......................... 137/614.19
1,865,231  6/1932  Buck ............................ 137/614.19
2,632,462  3/1953  Selwyn ......................... 137/614.19
3,344,807  10/1967 Lehrer .......................... 137/614.19
Primary Examiner—Laverne D. Geiger
Assistant Examiner—William H. Wright
Attorneys—Harry A. Herbert, Jr. and Arsen Tashjian ABSTRACT: Primary and secondary ball valves are operatively connected to one another in tandem by a compression transmitting member. The primary ball valve provides initial flow control between inlet and outlet ports. Failure of the primary valve because of excessive leakage causes the secondary valve to become operative thereby performing the sealing and flow control function in response to the main regulating pressure control element.

PATENTED JUN 29 1971

3,589,398

INVENTOR.
AUGUST F. HAACK
BY Harry A. Herbert Jr
and Arsen Tashjian
ATTORNEYS

PNEUMATIC PRESSURE REGULATOR REDUNDANT VALVING

BACKGROUND OF THE INVENTION

The present invention relates to an improved pneumatic pressure regulator valve and, more particularly, the invention is concerned with providing a pneumatic regulator with internally redundant valving to increase reliability.

Heretofore, in the interest of obtaining reliability through redundancy, it had been common practice to employ a multiplicity of separate regulators such that failure of one would automatically activate another thereby preventing loss of the regulation function. This conventional system for providing redundancy required the use of many connections since the inlet of one regulator must necessarily be connected to the outlet of the next adjacent one. The multiplicity of connections produces a corresponding number of leak possibilities which is of course undesirable.

Another disadvantage of the prior arrangement of using a multiplicity of separate regulators, is the necessity that they be all equal in operation so as to produce a constant output pressure regardless of which one was in operation at a particular time. This raised the problem of producing identical regulators having identical regulation characteristics with the associated calibration and installation problems. Also, such arrangements required more space and weight and did not lend themselves to easy and accurate adjustment and calibration to permit preselection and maintenance of the proper pressure at the outlet port. A much more desirable and reliable regulator system would be one where a single regulator driven by a single sensing piston can effectively control a plurality of valves to provide the required redundancy. Redundancy in the valving element is of paramount importance since it is by far the most susceptible element to failure. This last system would eliminate the requirement for separate regulators and the associated problems.

SUMMARY OF THE INVENTION

The present invention provides a pneumatic pressure regulator redundant valving arrangement wherein a plurality of ball valves are positioned in the control section of the regulator. The valves are operatively connected by a compression-transmitting pin member but otherwise have no direct connecting linkage. When and if the primary valve should fail the secondary or next adjacent valve becomes operative and provides both sealing and flow control to the output port. This is accomplished by positioning the ball valves in a tandem relationship such that the movement of the main pressure regulating member in response to pressure changes at the outlet port produces a corresponding movement in the currently operating ball valve.

The failure of the primary valve because of excessive leakage or failure to close causes the outlet pressure to rise and urge the secondary valve moving element toward its seat since it is not integrally connected to the primary valve element. The cavity between the two valves will then become pressurized to some level higher than regulation pressure. At this point the secondary valve begins to perform the sealing and control functions.

Accordingly, it is an object of the invention to provide a pneumatic regulator with internally redundant valving for increased reliability.

Another object of the invention is to provide a redundant valving system wherein a single regulator having a single sensing piston operates to drive a plurality of valve elements.

Still another object of the invention is to provide pressure regulator having a standard sensing piston in combination with primary and secondary valving elements. Failure of the primary valving element automatically causes the secondary element to take over the sealing and throttling function.

These and other objects, features and advantages will become more apparent after considering the description that follows taken in conjunction with the attached drawings wherein like numbers are used throughout to identify like elements.

DESCRIPTION OF A PREFERRED EMBODIMENT

Figure 1:
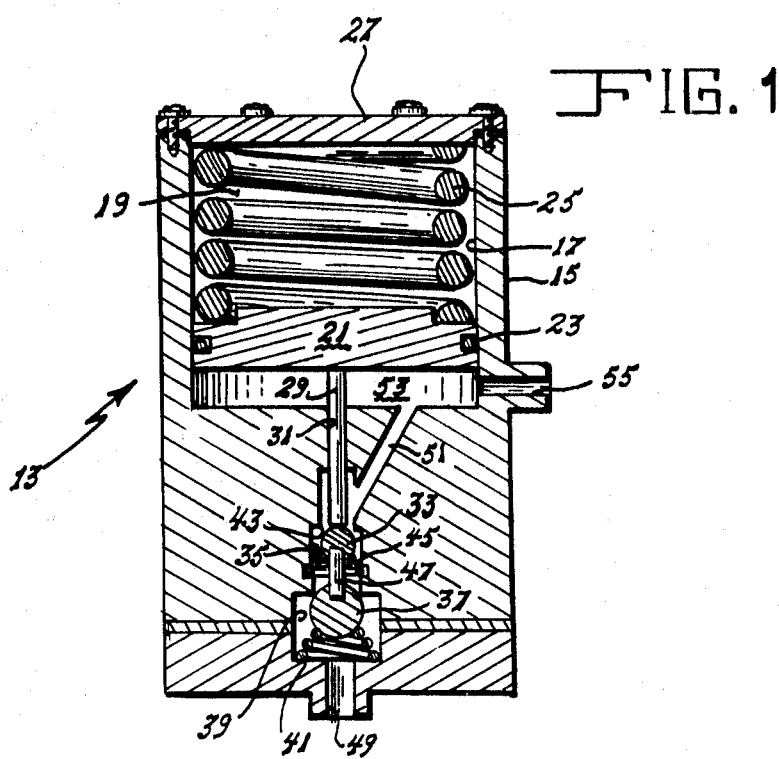
FIG. 1 is a cross-sectional view of the pressure regulator according to the invention showing the primary valving element operating the sealing function.

Referring now to FIG. 1, the drawing shows a typical regulator valve 13 having a generally tubular body portion 15 which includes a cylindrical bore section 17 forming the chamber 19. A piston 21 having a sealing element 23 thereon is positioned in the chamber 19 and is dimensioned to fit closely the walls of the cylinder bore 17. A spring 25 of known characteristics is disposed over the piston 21 and serves to urge the piston downward against pneumatic pressure in the lower part of the chamber 19. A cap 27 encloses and seals the top of the chamber 19 and serves as a fixed base for the spring 25.

A stem 29 extends downward from the piston 21 through a close fitting bore 31 and makes contact with a secondary valve ball check 33 which is disposed in the axial bore 35. Directly beneath the ball check 33 is the primary valve ball check 37 disposed in the axial bore 39. The ball check 37 is urged upward into the sealing position by the spring 41 while the ball check 33 is urged upward against the seat 43 by the spring 45. A compression transmitting spacer pin 47 is positioned between the ball checks 33 and 37 such that both elements can move independently in the vertical direction in their respective axial bores 35 and 39. This arrangement allows either one or both ball checks 33 and 37 to rest against their respective seats at any one time depending on the condition of the ball check 37 and the position of the piston 21.

The unregulated air or other fluid pressure is introduced into the inlet port 49 and passes through the passage 51 into the area 53 under the piston 21. The pressure in the area 53 controls the position of the piston 21 and thus the flow through the passage 51 which effectively regulates the output at the outlet port 55. The relative position of the elements as shown in FIG. 2 indicates the effect of failure of the ball check 37 to produce an effective seal and the subsequent movement of the ball check 33 upward against the seat 43 cutting off the flow of fluid and providing the necessary control to prevent failure of the regulator and provide the required redundancy.

MODE OF OPERATION

Figure 2:
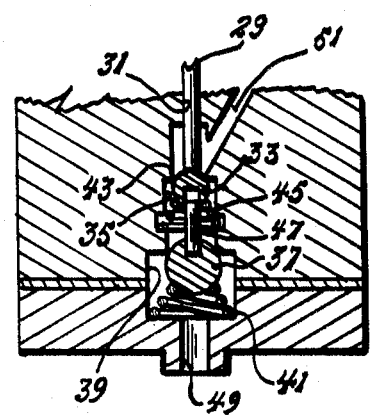
FIG. 2 is a cross-sectional view of the lower section of the pressure regulator of FIG. 1 showing conditions of failure of the primary valve and takeover of the sealing function by the secondary valve.

In operation, the invention encompasses the portion of the pressure regulator 13 shown in the lower section of FIGS. 1 and 2. The means for obtaining the driving force is arbitrary; a standard sensing piston 21 and spring 25 are shown.

In the FIG. 1 mode, the ball check 37 operates as the primary valve and is shown seated to perform the required sealing and throttling functions. Driving forces from the piston 21 are transmitted through the ball check 33 and the spacer pin 47. The ball check 33 operates as a secondary valve moving element and offers a minimum of resistance to the fluid flow.

As shown in FIG. 2, in the case of failure of the primary valve ball check 37 caused by excessive leakage or failure to close, the outlet pressure will rise causing the secondary valve ball check 33 to rise against the seat 43. This occurs because the two ball checks 33 and 37 are not integrally connected to one another. The area within the axial bore 35, which lies between the ball checks 33 and 37, will then become pressurized to some level higher than regulation pressure and the ball check secondary valve 33 then performs the sealing and regulation function which was originally performed by the ball check 37 prior to failure. Thus, there is provided a redundant valving system within a single regulator driven by a single sensing piston.

Although the invention has been illustrated in the accompanying drawings and described in the foregoing specification in terms of a preferred embodiment thereof, the invention is not limited to this embodiment or to the particular configuration mentioned. It will be apparent to those skilled in the art that my invention could have extensive use in many other sealing, throttling and control operations where reliability achieved by redundancy is a primary requirement. Also, it should be understood that various changes, alterations, modifications and substitutions, particularly with respect to the construction details, can be made in the arrangement of the several elements without departing from the true spirit and scope of the appended claims.

Having thus described my invention, what I claim as new and desire to secure by Letters Patent of the United States is:

1. A pneumatic pressure regulator having inlet and outlet ports therein comprising, in combination, a body portion having a cylindrical bore section with the outlet port in the lower part thereof, a piston slidably disposed in said cylindrical bore section above the outlet port, biasing means for urging said piston downward, a piston stem attached to the lower face of said piston and extending downwardly through a close fitting bore; and primary valve means disposed in a first axial bore in the lower section of said body portion in communication with the inlet port of said pneumatic regulator, secondary valve means disposed in a second axial bore immediately above and in communication with said first axial bore, said primary valve means and first axial bore being larger in diameter than said secondary valve means and second axial bore, biasing means for urging said primary and secondary valve means upward against their respective seats, said piston stem maintaining contact with the surface of said secondary valve means, and a spacer pin slidably positioned between and within said primary and secondary valve means for transmitting compressive forces from said piston stem through said secondary valve means to said primary valve means and for permitting independent vertical movement of said secondary valve means in response to the regulating movement of said piston stem after failure of said primary valve means.

2. The pneumatic regulator defined in claim 1 wherein a passage is provided for conducting pressurized fluid from the area above the secondary valve means to the area in said cylindrical bore beneath said piston in communication with the outlet port.

3. The pneumatic pressure regulator defined in claim 2 wherein said primary and secondary valve means are in the form of ball check valves.

4. The pneumatic pressure regulator defined in claim 3 wherein a sealing means is provided on the wall of said piston for preventing pressure leakage between said piston and the wall of said cylindrical bore section.

UNITED STATES PATENT OFFICE
CERTIFICATE OF CORRECTION

Patent No. 3,589,398      Dated 29 June 1971

Inventor(s) August F. Haack

It is certified that error appears in the above-identified patent and that said Letters Patent are hereby corrected as shown below:

In International Data Element [72], the inventor's name should read -- August F. Haack --.

Signed and sealed this 14th day of December 1971.

(SEAL)
Attest:

EDWARD M. FLETCHER, JR.
Attesting Officer

ROBERT GOTTSCHALK
Acting Commissioner of Patents